D. A. DERBY.
THILL RELEASING DEVICE.
APPLICATION FILED SEPT. 6, 1912.
1,068,328.
Patented July 22, 1913.
2 SHEETS—SHEET 1.
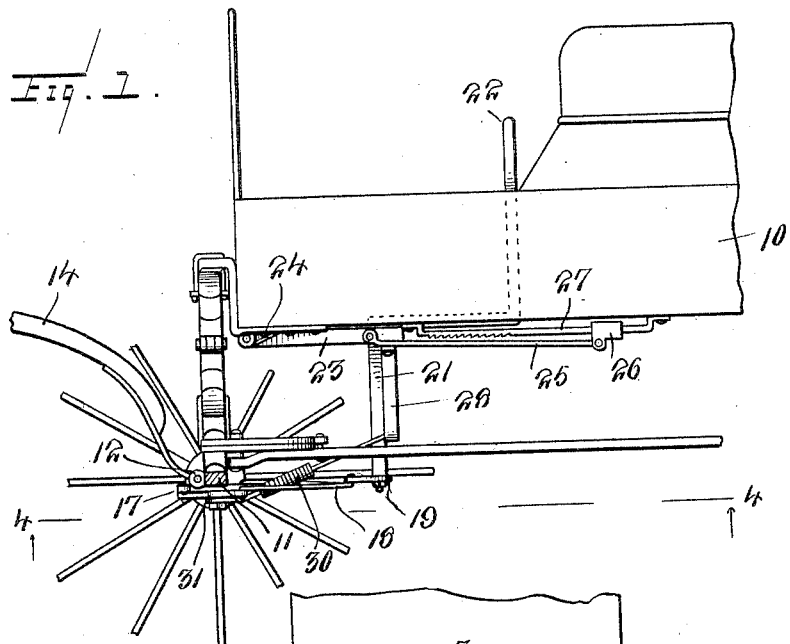
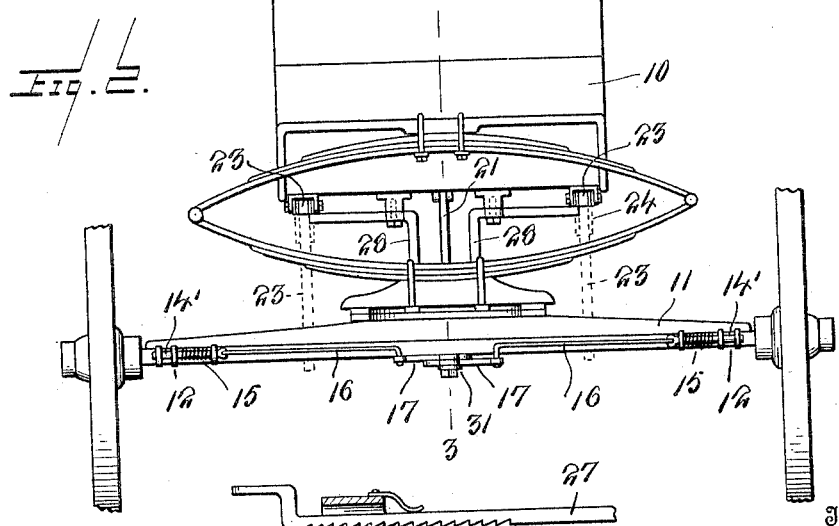

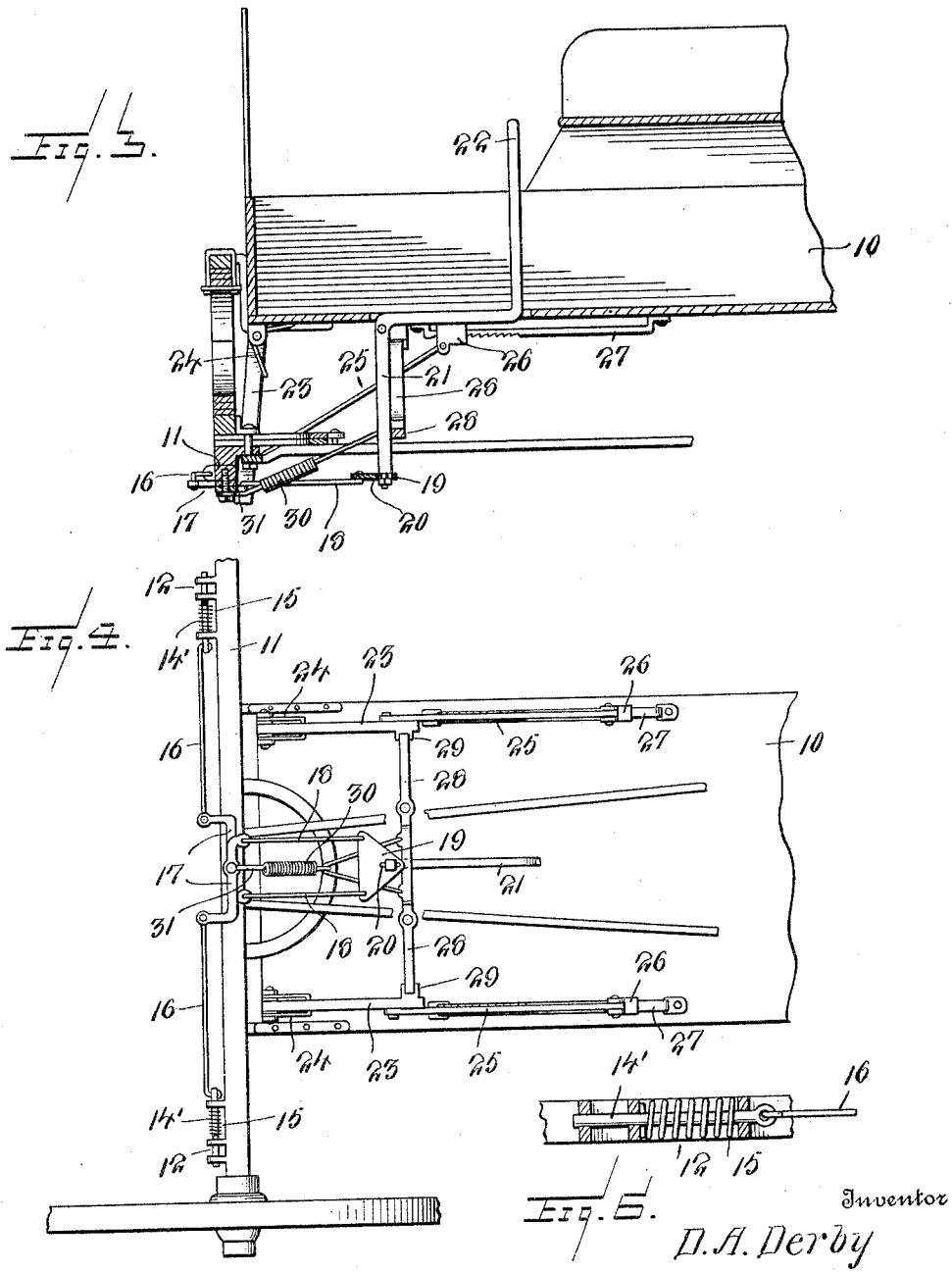

UNITED STATES PATENT OFFICE.

DAVID A. DERBY, OF KIT CARSON, COLORADO.

THILL-RELEASING DEVICE.

1,068,328.

Specification of Letters Patent.

Patented July 22, 1913.

Application filed September 6, 1912. Serial No. 718,955.

*To all whom it may concern:*

Be it known that I, DAVID A. DERBY, a citizen of the United States, residing at Kit Carson, in the county of Cheyenne and State of Colorado, have invented new and useful Improvements in Thill-Releasing Devices, of which the following is a specification.

The invention relates to carriages and wagons and has for an object to provide a device for releasing the thills from connection with a vehicle and for securing the forward part of the running gear of the vehicle in position to retain the vehicle on the highway after the thills have been released therefrom.

The invention embodies, among other features, a manually operative device arranged so that the same can be conveniently operated by the driver or other operator of the vehicle to release the thills from the vehicle in the case of a run away horse, means being provided to secure the front or guiding axle of the vehicle in rigid position to maintain the vehicle on the highway, after the thills have been released from the vehicle.

In the further disclosure of the invention reference is to be had to the accompanying drawings constituting a part of this specification in which similar characters of reference denote corresponding parts in all the views, and in which:

Figure 1 is a side elevation showing the device in initial position; Fig. 2 is a front elevation; Fig. 3 is a vertical longitudinal sectional view taken on the line 3—3 in Fig. 2, showing the device in final position; Fig. 4 is a horizontal sectional view taken on the line 4—4 in Fig. 1; Fig. 5 is a fragmentary vertical longitudinal sectional view of one of the locking members and the rack bar thereof; Fig. 6 is an enlarged vertical sectional view of one of the thill couplings showing the means for securing the thill to the coupling.

Referring more particularly to the views, I disclose a vehicle 10 provided with the usual swivelly mounted axle 11 at the front thereof, the said axle having suitable thill couplings 12 secured thereto in which the rear ends of thills 14 are releasably received, spring-actuated pins 14′ being mounted to slide on the thill couplings 12 to releasably retain the thills in connection with the said couplings, the said thills being releasable from the said couplings when the mentioned pins are pulled outwardly from the thill couplings against the action of springs 15 engaging the pins to normally retain the same in securing position on the thill couplings.

Connected to the pins are cords 16 having connection with the forward ends of S-shaped levers 17 arranged in crossed relation and having pivotal connection at their medial portions with the axle 11, cords 18 being connected to the rear ends of the crossed levers 17 and extending rearwardly beneath the body of the vehicle 10 to connect with a horizontally arranged plate 19 having a slot 20 through which passes a bell crank lever 21 mounted to swing on the under side of the vehicle with the upper end of the bell crank lever extending through an opening in the floor of the vehicle and terminating in a handle 22, the mentioned bell crank lever 21 being mounted in the vertical longitudinal plane of the said vehicle. Arms 23 are mounted to swing from the under side of the vehicle body at the front end thereof, the said arms, when in lowered position, being adapted to abut against the rear face of the axle 11. The arms 23 are engaged by springs 24 adapted to move the arms 23 downwardly, rods 25 being pivotally connected to the arms 23 and extending rearwardly and upwardly with the upper ends of the said rods having pivotal connection with toothed locking members 26 mounted to slide on rack bars 27 secured to the under side of the vehicle adjacent the side edges thereof. The teeth of the said rack bars are formed on the under sides thereof in order to be engaged by the teeth of the locking members 26 when the said locking members are in forward position on the rack bars, the arms 23 being at this time in lowered position, so that the locking members will lock the arms in lowered position with the lower ends of the arms abutting against the rear face of the axle 11 to secure the same in rigid position in a plane perpendicular to the longitudinal plane of the vehicle. Now the teeth on the under side of the rack bars are adapted to extend or be inclined forwardly and the teeth on the locking members are inclined rearwardly when the arms 23 are in raised position and are permitted to gravitate into lowered position, the locking members will easily slide forward on the rack bars, while at the same time the locking members will prevent the arms 23 from being moved upwardly by the exertion of a rearward pressure on the arms by the axle 11.

Supporting members 28 are mounted to swing on the under side of the vehicle 10 and the outer ends of the supporting members are adapted to be engaged by knobs 29 projecting from the inner faces of the said arms 23, to support the arms 23 in initial position and prevent the same from gravitating into lowered position, the inner ends of the members 28 being adapted to engage a rear face of the bell crank lever 21, springs 30 being connected to the members 28 and terminating in a single cord 31 having connection with the pin adapted to retain the levers 17 in pivotal connection with the axle 11.

In the use of my device, if the horse attached to the thills should run away, an upward pull is exerted on the handle 22, thus swinging the lower part of the bell crank lever 21 rearwardly to exert a pull on the cords 16 and move the pins 14 against the action of the springs 15 thereof, thus releasing the thills from the axle 11, this being accomplished through the medium of the crossed lever 17 having connection with the bell crank 21 through the medium of the cords 18. At the moment the bell crank lever 21 is operated to release the thills from the axle 11, the rearward movement of the lower part of the bell crank lever will swing the inner ends of the members 28 rearwardly, against the action of the springs 30, thus swinging the outer ends of the members 28 forwardly and out of engagement with the knobs 29 of the arms 23, thus releasing the arms 23 so that the same can readily gravitate into lowered position as shown in Fig. 3, the front faces of the arms being adapted to engage the rear face of the axle 11 adjacent the ends thereof and retain the axle in rigid position and in a plane at right angles to the longitudinal plane of the vehicle so that the vehicle will not tend to move from the highway, it being readily understood that if the axle 11 were not locked in rigid position as mentioned, the momentum of the vehicle would tend to carry the same off of the highway if the axle were free to move in any direction relatively to the vehicle, it being further seen that the arms 23 will be retained in lowered and locked position by the locking members 26 engaging the toothed portions of the rack bars 27, thus securely retaining the axle 11 in a position transverse to the longitudinal plane of the vehicle.

From the foregoing description it will thus be seen that by simply operating the bell crank lever 21, the thills will be released from connection with the vehicle and the guiding or forward axle of the vehicle will be secured in rigid position to prevent the vehicle from leaving the highway or being overturned from the highway.

Having thus described my invention, I claim:

1. In a device of the class described, the combination with members for releasably connecting the thills of a vehicle to the axle thereof, of arms mounted to swing on the vehicle and movable to engage the said axle and retain the same in a position transverse to the longitudinal plane of the vehicle, means for actuating the said members to release the said thills from the axle of the said vehicle and simultaneously release the said arms and permit the same to gravitate into engagement with the said axle, and locking members movable on the under side of the vehicle to retain the said arms in lowered and locked position.

2. In a device of the class described, the combination with arms mounted on the under side of a vehicle and movable to engage the axle of the vehicle and retain the same in rigid position on the vehicle, of means for releasing the said arms to permit the same to gravitate into engagement with the said axle, rack bars secured to the under side of the vehicle, and locking members movable on the said rack bars to lock the said arms in engagement with the said axle.

3. In a device of the class described, the combination with arms mounted on the under side of a vehicle and movable to lock the axle thereon in rigid position, of pins for releasably retaining the thills of the vehicle in engagement therewith, a bell crank lever mounted on the vehicle and movable to simultaneously release the said thills from engagement with the said vehicle and release the said arms to permit the same to move into engagement with the said axle, and locking members connected with the said arms and movable on the under side of the said vehicle to lock the said arms in engagement with the said axle.

In testimony whereof I affix my signature in presence of two witnesses.

DAVID A. DERBY.

Witnesses:
A. O. WELTEN,
JAS. W. BROWN.

---

Copies of this patent may be obtained for five cents each, by addressing the "Commissioner of Patents, Washington, D. C."